Aug. 19, 1924.

H. M. ALEXANDER 1,505,841

METHOD OF AND MEANS FOR SEPARATING LIQUIDS OF DIFFERENT SPECIFIC GRAVITY

Filed June 26, 1924    2 Sheets-Sheet 1

Inventor
H. M. Alexander
by Wilkinson &
Giusta
Attorneys.

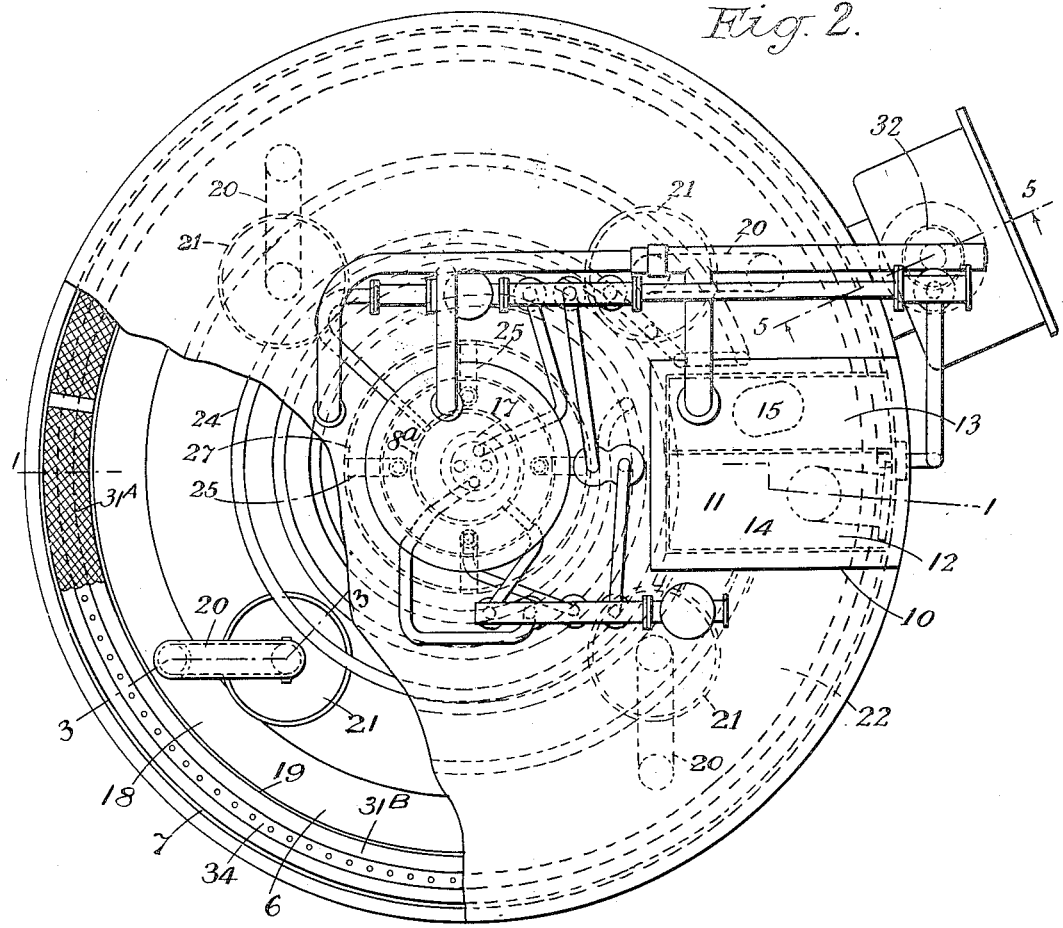
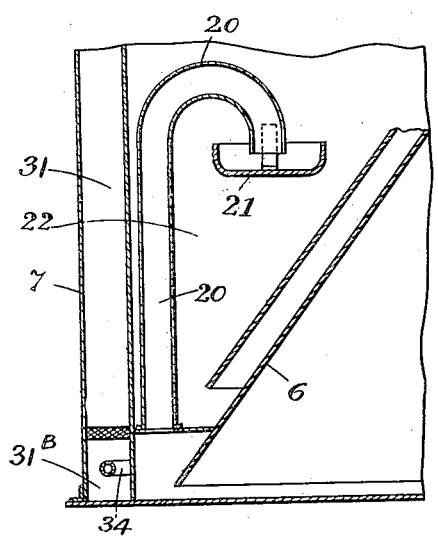

Patented Aug. 19, 1924.

1,505,841

UNITED STATES PATENT OFFICE.

HAROLD MONTAGUE ALEXANDER, OF BEXLEY HEATH, ENGLAND.

METHOD OF AND MEANS FOR SEPARATING LIQUIDS OF DIFFERENT SPECIFIC GRAVITY.

Application filed June 26, 1924. Serial No. 722,571.

*To all whom it may concern:*

Be it known that I, HAROLD MONTAGUE ALEXANDER, a subject of the King of Great Britain, residing at Alconbury, Broomfield Road, Bexley Heath, in the county of Kent, England, have invented a certain new and useful Improved Method of and Means for Separating Liquids of Different Specific Gravity, of which the following is a specification.

This invention relates to methods of and apparatus for decanting or separating from a mixture thereof liquids of different specific gravity; this invention being particularly applicable to the separation and recovery of oil from a mixture of oil and water and the delivery of water free—or substantially free—of oil; and will, for convenience, be more particularly described hereinafter as applied to such separation of oil and water from a mixture thereof, although understood to be applicable as aforesaid to the separation from a mixture thereof, of any liquids of different specific gravity capable of being separated thereby.

The method of separating liquids of different specific gravity from a mixture thereof, according to the present invention consists in subjecting said mixture to a preliminary separation, withdrawing the effluent heavier liquid with any lighter liquid remaining therein after such preliminary separation and subjecting said effluent to a further separation by delivering it into a body of the heavier liquid, collecting the separated lighter liquid at the top of said body, withdrawing the heavier liquid evenly from all round the bottom of the said body and separately discharging the lighter and heavier liquids respectively.

The present invention may be carried into practice in conjunction with any separating chamber into which said mixture has been delivered for preliminary separation; in which case the method according to this invention consists in (*a*) delivering the whole of the effluent water or heavier liquid (which may still contain some of the oil or lighter liquid) from the said preliminary separating chamber into an outer tank forming an annular chamber surrounding said central chamber (*b*) delivering said effluent from said central chamber into said outer annular chamber at a number of points therein spaced apart—advantageously equi-distant apart—around said annular chamber, each such point of delivery being located as to height in said chamber at or about the centre of gravity of the radial section of said annular chamber and being located as to distance from the vertical axis of said chamber at or about the radius of gyration of the mass of liquid in said chamber, and (*c*) delivering the said effluent into said annular chamber at each said point in a vertically downwardly directed outlet against a dished baffle plate or cup arranged below said outlet and adapted to deflect or direct the incoming mixture upwards at each said point.

According to a further part of the present invention the said effluent heavier liquid from the annular chamber may be passed through a final filtering chamber which may advantageously be arranged as an annular filtering chamber (containing any suitable filtering material) surrounding the said outer tank through which annular filtering chamber the effluent heavier liquid is passed —before final discharge from the apparatus—to thereby remove any last traces of oil or lighter liquid.

My present invention is especially suitable for use in conjunction with the method and apparatus for separating liquids of different specific gravity described in my prior U. S. Patent No. 1,490,794 granted April 15, 1924 and particularly the type of apparatus described with reference to and illustrated in Figs. 4 and 5 of the drawings annexed to said Patent No. 1,490,794; in which latter case, according to the present invention, the separation is carried out in two principal stages, the first taking place in an inner chamber of truncated conical shape open all round the lower end and surmounted by a tubular casing to receive the separated lighter liquid. The second stage is carried out in an outer tank surrounding the conical chamber, the lighter liquid accumulating in the upper part of said tank and the effluent heavier liquid being withdrawn from the lower part thereof, and preferably conducted thence to a level such as to maintain a hydrostatic balance between the column of liquid external to the inner separating chamber and the column of heavier liquid and superposed lighter liquid within the latter chamber and from this said level the effluent heavier liquid is discharged in any desired manner.

As oil and water form a characteristic mixture suitable for separation in accordance with this invention, I will, for convenience of description refer hereinafter to the lighter liquid as oil and to the heavier liquid as water.

An apparatus constructed in accordance with my present invention is illustrated in the accompanying drawings, in which:—

Fig. 2 is a plan view partly in section.

Fig. 3 is a diagrammatic local vertical sectional view on the line 3—3 Fig. 2, to illustrate the position of the pipe 20.

Referring to these drawings:—

Figure 1:
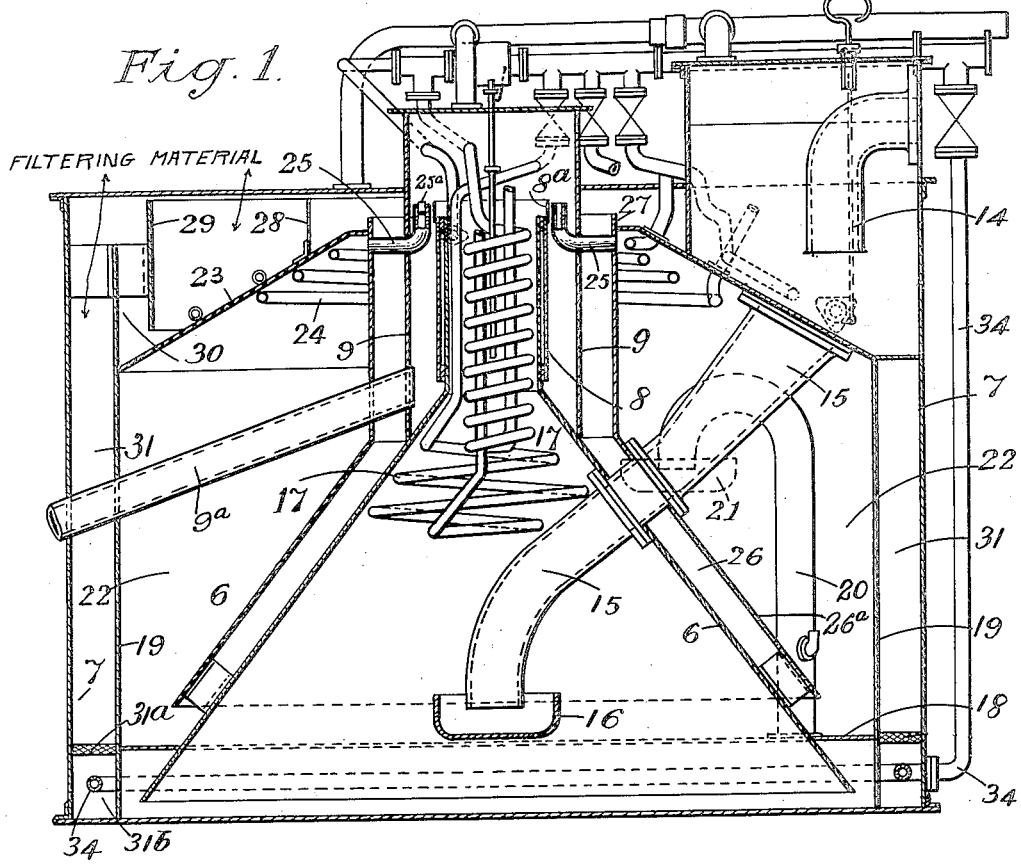
Fig. 1 is a vertical sectional view on the line 1—1 Fig. 2 of the apparatus.

A truncated conical or inverted funnel-shaped casing 6 is located centrally within the tank 7. This casing 6 is open all round its lower end and is surmounted by a tubular casing 8 surrounded by a circular casing 9 forming the oil receptacle.

10 is a feed box divided, by the vertical partition 11, into two compartments 12 and 13, both open to the atmosphere.

The mixture to be separated is delivered by the feed pipe 14 into the compartment 12, flows over the top of the partition 11 into the compartment 13, and thence passes through the inlet pipe 15 leading into the chamber 6, and is delivered against the dished deflecting baffle 16 which causes said mixture to take an upward flow in the body of liquid in the chamber 6. The oil rises in the body of liquid and collects in the tubular casing 8 and the upper part of the chamber 6 and for the purpose of keeping the oil in a freely fluid condition heating pipes 17 are provided. The separated oil overflows the tubular casing 8 in the manner described in my patent specification No. 1,490,794, into the receptacle 9; and the water, in some cases carrying with it a small proportion of oil, mainly in the form of small drops or particles of oil, flows out under the open lower end of the cone 6. The oil is conveyed off from the receptacle 9 by means of the pipe 9ª.

A circular plate or cover 18 connects the cone 6 and a wall 19 and prevents escape of the effluent except through pipes 20, of which latter there may be any desired number; and in the apparatus illustrated four such pipes 20 are shown.

These pipes 20 (Figs. 1 and 3) conduct the effluent water upwards in the outer tank and then direct it downwardly against dished deflecting baffles 21, which act in a manner similar to the deflecting baffle 16, causing the liquid to assume an upward movement which causes or assists the oil to separate out and collect in the upper part of the annular chamber 22 formed by the wall 19 (surrounding the cone 6) and a roof 23.

The oil collected in this annular chamber 22 (kept freely fluid as desired—for example by a heating coil 24) passes through pipes 25 into the oil receptacle 9.

The water now relieved of substantially all of its oil content passes out from the lower part of the chamber 22 through an annular passage 26 formed by a baffle 26ª and cone 6 and overflows a weir 27 on to the upper surface of the roof 23 on which is mounted a vertical perforated plate 28 between which latter and a vertical plate 29 any suitable filtering medium may be provided; and the water passes out under the plate 29, rises in the passage 30 (see Fig. 1) and then passes downwardly through an annular filtering chamber 31 filled or partly filled with any suitable filtering medium.

Figure 4:
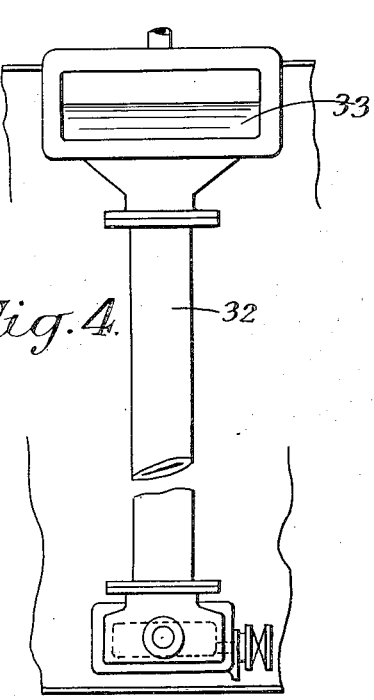
Fig. 4 is a view in elevation of a detail viz, suitable means for discharging the final effluent heavier liquid.
Figure 5:
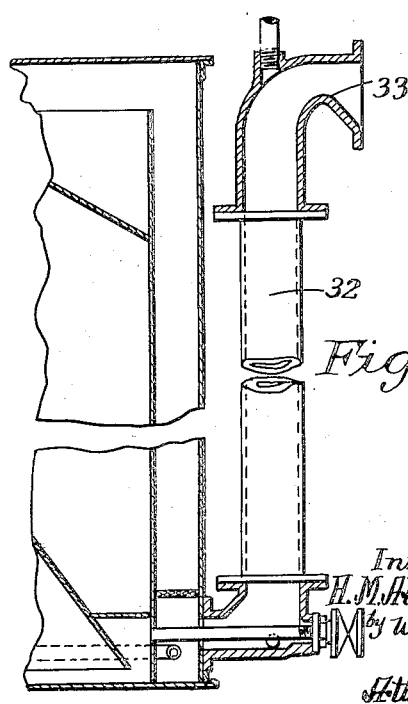
Fig. 5 is a local vertical sectional view on line 5—5 of Fig. 2.

The effluent heavier liquid leaves the lower end of this annular filtering chamber or scrubber 31 through the supporting grid or grating 31ª into the annular chamber 31ᵇ and from this latter is led by a pipe 32 to a discharge weir 33 (see particularly Figs. 4 and 5).

In order to maintain the hydrostatic balance between the column of heavier liquid external to the chamber 6 and the column of heavier liquid with its superposed column of lighter liquid within the chamber 6 and the tubular casing 8, the latter is provided with a movable collar 8ª (see Fig. 1) at the top end thereof and adjustable thereon to vary the height of the oil discharge level.

If desired, each of the pipes 25 may be provided with an adjustable weir 25ª for adjusting the level of the outlet therefrom.

34 is a pipe for introducing either steam or air or water into the annular filtering chamber for cleaning or other purposes.

In the use of the device, a mixture of oil and water is fed in through the filling pipe 14 into the compartment 12 of the box 10. This mixture overflows the weir 11 and into the adjoining compartment 13 whence it flows out through the pipe 15 and into the central chamber encompassed by the conical casing 6. The material is let into the body of liquid undergoing separation within the cone at substantially the center of mass and is deflected upwardly by the dished baffle 16 which baffle prevents short circuits between the entering mixture and the heavier effluent which passes out beneath the lower wider edge of the cone 6. The oil, or lighter constituent ascends into the narrow cylindrical casing 8, overflowing evenly all round the top thereof or over the adjustable collar 8ª; this column of oil being kept in a suitably fluid state, where necessary, by heat obtained through the coils 17 and jacket 8.

The liquid in the central chamber thus constitutes one column and in this central chamber the mixture undergoes a preliminary separation which removes the major portion of the oil content from the water. This water flows out from the central chamber or column evenly all round the wide base of the cone with a slow movement and is restrained from directly entering the space within the tank 19 about the cone by reason of the plate 18; but this water or heavier effluent from the preliminary separation is permitted to ascend in the pipes 20 which convey the heavier effluent to points in the tank space 22 where such entering liquid will have a minimum effect to disturb the surrounding body of liquid which is undergoing a secondary separation in said tank space. I find, as the result of many experiments, that the annular body of liquid in the tank space will be less disturbed, and the progress of the separation taking place in this space will be accelerated by letting in the heavier effluent from the preliminary separation at points of delivery in the tank space located as to height at or about the center of gravity of the radial section of the annular space or chamber 22 and as to distance from the vertical axis of the annular chamber at or about the radius of gyration of the mass of liquid in said annular chamber. The delivery ends of the pipes 20 are located in the annular space 22 in accordance with this principle and a number of the pipes are used spaced equi-distant circumferentially about the axis of the tank in order to secure a proper balance. The heavier effluent being delivered downwardly by reason of the curved upper portions of the pipes 20 is deflected upwardly by the baffles 21 which prevent short circuits between the liquid entering through the pipes 20 and the outlet for the heavier effluent from the secondary separation which is about the lower end of the conical baffle 26ᵃ. With the arrangement of parts as just described, the annular body of liquid in the tank space 22 is found to be unusually quiescent and the separation of large quantities of material is susceptible of being carried out rapidly while the device is practically free from any local disturbances or "vortices."

The oil in the secondary stage of separation ascends against the roof 23 and is guided thereby to the outlet pipes 25 over which the oil flows into the common oil receptacle 9. The effluent heavier liquid or water from the secondary stage is admitted into the space between the cone 6 and the conical baffle 26ᵃ and ascending in this space overflows the weir 27 evenly all round at a less height than the column of liquid in the first stage of separation so that a balance is maintained between the two columns admitting of the continuous operation of the device, without reference to differences in percentage of the oil content or variations in the rate of mixture supply.

The water overflowing the weir 27 passes down above the incline roof 23 through the perforated baffle 28 and beneath a solid baffle 29. It will be noted that the area increases toward the outer edge of the roof 23 and consequently the current of the water will be very much reduced in velocity thus providing a suitable place for filtration. Moreover the liquid overflows the wall 19 and descends through the filter space 31 into the annular chamber 31ᵇ from which it passes out into the stand pipe 32 overflowing at 33.

While the accompanying drawings illustrate my present invention as carried into practice in conjunction with apparatus of the type illustrated in my patent specification No. 1,490,794 as aforesaid, nevertheless, it is to be clearly understood that my present invention may be carried into practice in conjunction with any other suitable apparatus for effecting a preliminary separation of such liquids of different specific gravity to which my present inventon may be applicable.

What I claim is:—

1. The herein described method for separating liquids of different specific gravities, which consists in introducing, into a body of the liquids undergoing separation, a mixture of the liquids to be separated at points located as to distance from the vertical axis of the liquid body substantially at the radius of gyration of the mass of liquid in said body and as to height in said body substantially at the center of gravity of the radial sections of said body, and withdrawing and collecting the separated constituents.

2. The method for separating liquids of different specific gravities which consists in subjecting the mixture to be separated to a preliminary separation, drawing off the heavier effluent and introducing same into a secondary body of liquid undergoing separation at points located as to height in the secondary body substantially at the center of gravity of radial sections of said secondary body and as to distance from the vertical axis of the secondary body substantially at the radius of gyration of the mass of liquid constituting said secondary body, and withdrawing and collecting the constituents from the secondary body separately.

3. The herein described method for separating liquids of different specific gravities which consists in subjecting the liquid mixture to a preliminary separation, withdrawing the heavier effluent from this preliminary separation and introducing the same into a secondary body of liquid undergoing separation at points located as to height in said body substantially at the center of gravity of radial sections of said secondary body and as to distance from the vertical axis of said secondary body substantially at the radius of gyration of the mass of liquid constituting said secondary body, withdrawing and collecting the lighter liquid from both preliminary and secondary separations, and withdrawing and filtering the heavier effluent from the secondary stage of separation.

4. An apparatus for the separation of liquids of different specific gravities comprising a tank for holding a body of liquid undergoing separation, means for introducing into said body a mixture of the liquids to be separated at points located as to distance from the vertical axis of said tank substantially at the radius of gyration of the body of liquid in said tank and as to height in said tank substantially at the center of gravity of radial sections of said body of liquid, and means for conveying off separately the constituents from said body of liquid.

5. An apparatus for the separation of liquids of different specific gravities comprising a casing adapted to surround a mixture of the liquids to be separated and wherein a preliminary separation may take place, means to introduce a mixture of liquids into said casing, a tank extending about said casing for holding a secondary body of liquid undergoing separation, means for receiving the heavier effluent from said casing and conducting the same into the body of liquid in said tank at points located as to height in said tank substantially at the center of gravity of radial sections of the secondary body in said tank and as to distance from the vertical axis of said tank substantially at the radius of gyration of the body of liquid in said tank, and means for drawing off and collecting separately the separated constituents of the mixture from said tank.

6. An apparatus for the separation of liquids of different specific gravities comprising a casing adapted to surround a body of liquid undergoing separation, means to introduce the liquid mixture into said casing, a second casing above and in communication with the first mentioned casing for collecting the lighter constituent, a tank containing said casings and having a substantially annular space about the casings for holding a secondary body of liquid undergoing separation, a plurality of pipes for receiving the heavier effluent from said casing and introducing the same into the secondary body of liquid, in said tank at points located as to height substantially at the center of gravity of radial sections of said annular body and as to distance from the vertical axis of said annular body substantially at the radius of gyration of the annular mass of liquid forming said secondary body, and means for separately drawing off from the secondary body the recovered constituents of the mixture.

7. An apparatus for the separation of liquids of different specific gravities comprising a conical casing adapted to surround a body of liquid to be separated, a second casing above and in communication with the conical casing adapted to receive the lighter constituent and to permit the lighter constituent to overflow evenly all round the upper portion thereof, means to introduce a mixture of the liquids into the conical casing, a tank in which said conical casing is suspended, said tank having an annular space for containing a secondary body of liquid undergoing separation, a number of pipes spaced apart equi-distantly in a circumferential direction place to receive the heavier effluent from said conical casing and to introduce such effluent in a substantially downward direction in the secondary body of liquid, at points located as to height in said secondary body substantially at the center of gravity of the radial sections of said secondary body and as to distance from the vertical axis of said tank substantially at the radius of gyration of the mass of liquid forming said secondary body, baffles mounted in conjunction with said pipes for deflecting the incoming effluent upwardly of the body in said tank, and means for withdrawing and collecting separately the recovered constituents of the mixture.

8. An apparatus for the recovery of liquids of different specific gravities from a mixture thereof comprising a tank adapted to contain a substantially annular secondary body of liquid undergoing separation, a conical casing suspended above the base of the tank and adapted to surround a body of liquid undergoing preliminary separation, means for introducing into the conical casing a mixture of the liquids to be separated, means in conjunction with the conical casing for collecting the lighter constituent, the heavier constituent separated in said casing flowing out around the lower edge of the conical casing, a plate between the conical casing and said tank wall for cutting off the direct flow of the heavier effluent to the secondary body, pipes in the tank communicating through the plate with the heavier effluent and having downwardly directed delivery ends disposed in said secondary body at points located as to height in said secondary body substantially at the center of gravity of radial sections of said secondary body and as to distance from the vertical axis of the tank substantially at the radius of gyration of the mass of liquid in said annular tank space, baffles mounted in conjunction with the delivery ends of the pipes for deflecting the first effluent upwardly, a conical baffle spaced from said conical casing and having its lower end adapted to receive the heavier effluent from said secondary body, a weir connecting with the space between the conical casing and said conical baffle for allowing the heavier effluent to overflow evenly all round the axis of the tank, and means for conveying off the lighter constituent from the secondary body.

9. An apparatus for the separation of liquids of different specific gravities comprising a tank adapted to contain a secondary body of liquid undergoing separation, a sloped roof for the tank, means within the tank to surround an initial body of the liquids to be separated, pipes for conveying the heavier effluent from within said means to points in the secondary body located as to height in said secondary body substantially at the center of gravity of radial sections of said secondary body and as to distance from the vertical axis of said tank substantially at the radius of gyration of the mass of liquid in said secondary body, a substantially annular weir in communication with the heavier effluent from said secondary body, said weir being disposed above the higher part of said tank roof, a baffle space above the lower portion of the roof, filtering material on said sloping roof held in place by said baffle, the tank wall extending above the lower portion of said roof and forming a weir over which the filtered effluent flows, and an outer tank wall spaced from the first named tank wall providing an annular space for containing filtering material through which the heavier effluent flows after passing over the last named weir.

10. An apparatus for the separation of liquids of different specific gravities comprising a casing adapted to surround an initial body of liquid to be separated, a second casing communicating with the first casing for collecting the lighter constituent and permitting said constituent to overflow evenly all round the upper end thereof, means for introducing a mixture of the liquids to be separated into the first mentioned casing, a tank surrounding the first mentioned casing and adapted to contain a substantially annular secondary body of liquid undergoing separation, a plate in the lower portion of the tank to prevent the heavier effluent from the first mentioned casing passing directly into the annular tank space, pipes in the tank space having communication through said plate with the heavier effluent from the first mentioned casing, said pipes adapted to convey the said heavier effluent into the secondary body of liquid, means for collecting the lighter constituent from the annular space in the tank, a baffle spaced from the first mentioned casing forming therewith a passage for receiving the heavier effluent from the second separation in the tank, and a weir connecting with said passage for receiving the last mentioned heavier effluent and permitting the same to overflow evenly all round said weir at a height less than the lighter constituent in the second mentioned casing.

11. An apparatus for the separation of liquids of different specific gravities comprising a tank, a conical casing supported in the tank above the base thereof, a second casing communicating with the conical casing for receiving the lighter constituent, means to introduce a mixture of liquids to be separated into said conical casing, a receptacle extending about said second casing for catching the oil therefrom, a plate extending between said tank and said conical casing near the lower end of the conical casing, pipes connected through said plate for conveying the heavier effluent from the conical casing into the tank space, a sloping roof for said tank, means communicating with the upper portion of the tank for conveying the lighter constituent to said receptacle, a conical baffle spaced from said conical casing and forming a passage therewith open at its lower portion to receive the heavier effluent from the secondary separation in said tank, a weir extending about said receptacle and communicating with said passage, a perforated baffle above the upper portion of the sloping roof to receive the heavier effluent from said weir, a sloping baffle spaced above the lower portion of said roof for guiding the heavier effluent therebetween, filtering material between said perforated and solid baffles, an annular filtering chamber extending about said tank for receiving the heavier effluent after passing beneath said solid baffle and a stand pipe communicating with said annular filtering chamber for discharging the filtered heavier effluent at a point below the overflow of lighter constituent from the second named casing.

HAROLD MONTAGUE ALEXANDER.